(12) United States Patent
Salter et al.

(10) Patent No.: US 10,043,396 B2
(45) Date of Patent: Aug. 7, 2018

(54) PASSENGER PICKUP SYSTEM AND METHOD USING AUTONOMOUS SHUTTLE VEHICLE

(71) Applicant: Ford Global Technologies, LLC, Dearborn, MI (US)

(72) Inventors: Stuart C. Salter, Dearborn, MI (US); Pietro Buttolo, Dearborn Heights, MI (US); Paul Kenneth Dellock, Northville, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/263,861

(22) Filed: Sep. 13, 2016

(65) Prior Publication Data

US 2018/0075754 A1   Mar. 15, 2018

(51) Int. Cl.
| | |
|---|---|
| *G08G 1/00* | (2006.01) |
| *B60R 25/01* | (2013.01) |
| *B60R 25/102* | (2013.01) |
| *B60R 25/104* | (2013.01) |
| *B60R 25/23* | (2013.01) |
| *B60R 25/30* | (2013.01) |

(Continued)

(52) U.S. Cl.
CPC ............ *G08G 1/202* (2013.01); *B60R 25/01* (2013.01); *B60R 25/102* (2013.01); *B60R 25/104* (2013.01); *B60R 25/23* (2013.01); *B60R 25/302* (2013.01); *G06F 17/00* (2013.01); *G06F 21/00* (2013.01); *G06Q 10/02* (2013.01); *H04M 1/72522* (2013.01); *H04W 4/023* (2013.01); *H04W 4/046* (2013.01); *G06K 9/00838* (2013.01)

(58) Field of Classification Search
None
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |

(Continued)

FOREIGN PATENT DOCUMENTS

| | | | |
|---|---|---|---|
| CN | 101337492 A | 1/2009 | |
| CN | 201169230 Y | 2/2009 | |

(Continued)

OTHER PUBLICATIONS

Malhorta, et al., Location Estimation in Ad-Hoc Networks with Directional Antennas, Proceedings of the 25th IEEE International Conference on Distributed Computing Systems, 2005.*

*Primary Examiner* — Redhwan K Mawari
*Assistant Examiner* — Edward Torchinsky
(74) *Attorney, Agent, or Firm* — Jason Rogers; Price Heneveld LLP

(57) ABSTRACT

A passenger pickup system and method is provided herein. A mobile electronic device is used by an intended passenger to input a pickup request. A vehicle is dispatched to a pickup location and is configured to detect a location of the passenger based on a signal exchange between the vehicle and the electronic device, display a vehicle identifier notifying the passenger of the vehicle's arrival, and deny the passenger from entering the vehicle until a security code is received from the electronic device.

19 Claims, 4 Drawing Sheets

(51) Int. Cl.
*G06F 17/00* (2006.01)
*G06Q 10/02* (2012.01)
*H04M 1/725* (2006.01)
*H04W 4/02* (2018.01)
*H04W 4/04* (2009.01)
*G06F 21/00* (2013.01)
*G06K 9/00* (2006.01)

(56) References Cited

U.S. PATENT DOCUMENTS

| | | | |
|---|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,963,705 B2 | 2/2015 | Miller et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,442,888 B2 * | 9/2016 | Stanfield ............ G08G 1/20 |
| 9,579,987 B2 | 2/2017 | Penilla et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0029281 A1 | 1/2014 | Suckling et al. |
| 2014/0058896 A1 | 2/2014 | Jung |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2015/0369621 A1 | 12/2015 | Abhyanker |
| 2016/0016506 A1 | 1/2016 | Collins et al. |
| 2016/0082880 A1 | 3/2016 | Co et al. |
| 2016/0214535 A1 | 7/2016 | Penilla et al. |
| 2016/0236613 A1 | 8/2016 | Trier |
| 2017/0213165 A1 * | 7/2017 | Stauffer ............ G06Q 10/02 |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |

(56) References Cited

FOREIGN PATENT DOCUMENTS

| | | |
|---|---|---|
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2015099679 A1 | 7/2015 |

* cited by examiner

PASSENGER PICKUP SYSTEM AND METHOD USING AUTONOMOUS SHUTTLE VEHICLE

FIELD OF THE INVENTION

The present invention generally relates to autonomous shuttle vehicles, and more particularly, to systems and methods of picking up an intended passenger with an autonomous shuttle vehicle.

BACKGROUND OF THE INVENTION

As autonomous vehicles become more widespread, it is contemplated that some such vehicles will be provided to shuttle passengers to and from various locations, similar to taxis. In instances where multiple vehicles are operating in the same environment, an intended passenger waiting to be picked up may be confused as to which vehicle to choose. Such a problem may arise in instances where each vehicle has its own route and/or shuttles multiple passengers at once. Without additional safeguards, an intended passenger risks entering the wrong vehicle. Accordingly, there is a need for a passenger pickup system that enables an intended passenger to make a pickup request and correctly identify a vehicle as the requested vehicle.

SUMMARY OF THE INVENTION

According to one aspect of the present invention, a passenger pickup system is provided. The system includes a mobile electronic device with which an intended passenger inputs a pickup request. A vehicle is dispatched to a pickup location and is configured to broadcast a signal, determine a location of the passenger based on a signal exchange between the vehicle and the electronic device, and display a vehicle identifier notifying the passenger of the vehicle's arrival.

According to another aspect of the present invention, a passenger pickup system is provided. The system includes a mobile electronic device with which an intended passenger inputs a pickup request. A vehicle is dispatched to a pickup location and is configured to detect a location of the passenger based on a signal exchange between the vehicle and the electronic device, display a vehicle identifier notifying the passenger of the vehicle's arrival, and deny the passenger from entering the vehicle until a security code is received from the electronic device.

According to yet another aspect of the present invention, a passenger pickup method is provided and includes the steps of making a pickup request using a mobile electronic device; dispatching a vehicle to a pickup location; determining a location of an intended passenger based on a signal exchange between the vehicle and the electronic device; and displaying a vehicle identifier notifying the passenger of the vehicle's arrival.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
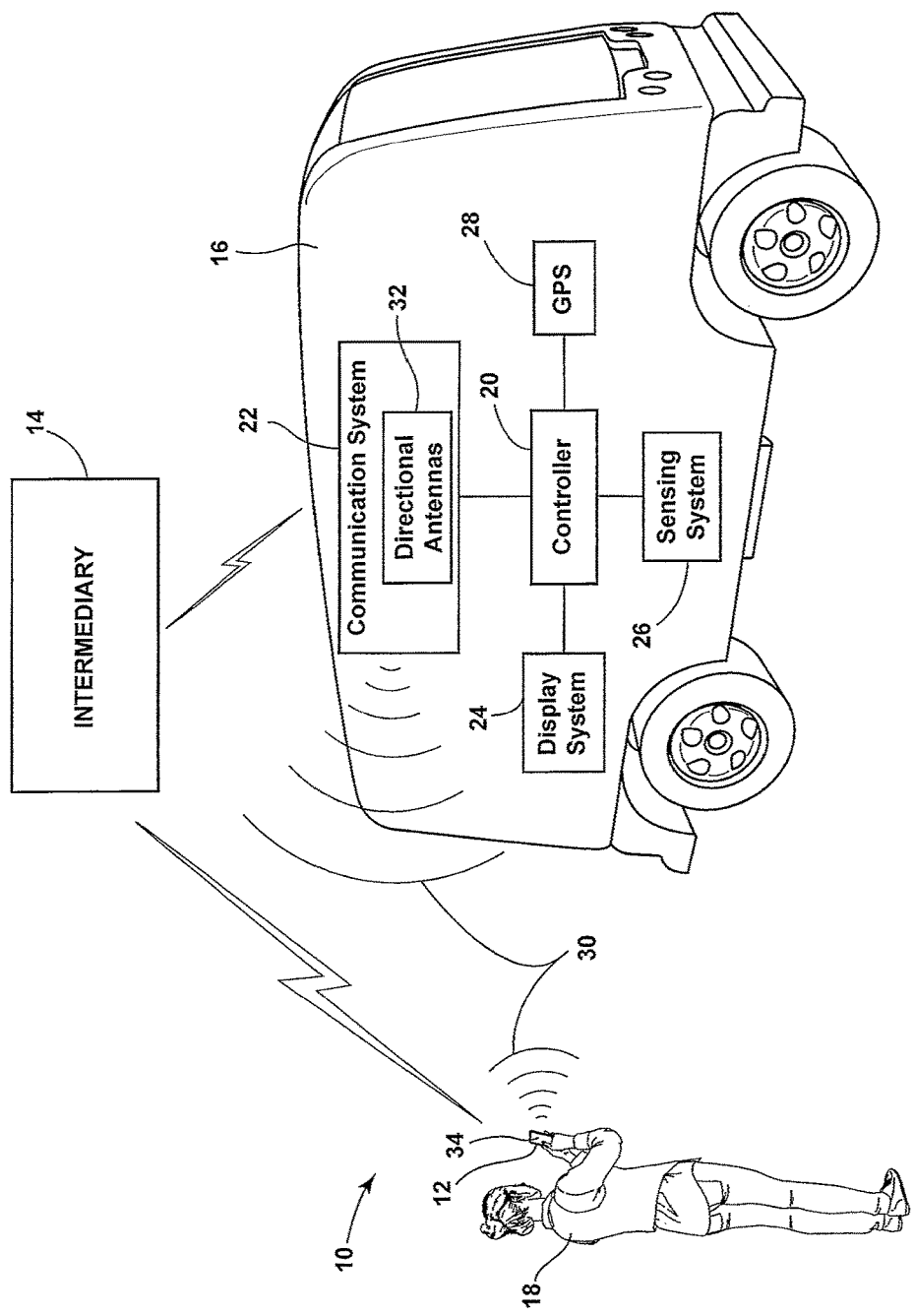
FIG. 1 is a schematic view of a passenger pickup system according to one embodiment.

Referring to FIG. 1, reference numeral 10 generally designates a passenger pickup system that includes a mobile electronic device 12, an intermediary 14, and a vehicle 16. The mobile electronic device 12 is in the possession of an intended passenger 18 and may be embodied as a smartphone, tablet, or the like. The mobile electronic device 12 includes an application stored thereon that enables the intended passenger 18 to input a pickup request. The pickup request may include trip information such as, but not limited to, a time and date of pickup, a pickup location, a drop off location, a number of passengers, etc. Once inputted, the pickup request is sent to the intermediary 14, which may include a remote web-based (e.g., cloud computing) shuttle service provider. Alternatively, the intended passenger 18 may call in to the service provider to make the pickup request. The intermediary 14 processes the pickup request and dispatches the vehicle 16 to a pickup location, which may correspond to a pickup location selected by the intended passenger 18 or the intermediary 14 (e.g., the pickup location desired by the intended passenger 18 is not accessible or is not on the prescribed route of the vehicle 16).

The vehicle 16, depicted herein as an autonomous shuttle vehicle, includes a controller 20 coupled to a communication system 22, a display system 24, a sensing system 26, and a global positioning system (GPS) 28. The controller 20 may be configured as a standalone controller or otherwise be integrated or part of an existing vehicle system. The controller 20 may communicate with the aforementioned components of the vehicle 16 through a vehicle network such as a CAN bus, a LIN bus, or other network known to a skilled artisan. The controller 20 may be configured with a microprocessor and/or other analog and/or digital circuitry for processing one or more logic routines stored in a memory. The routines may be processed using the microprocessor in order to implement the various features described herein, which may include detection of the mobile electronic device 12 and autonomous control of the vehicle 16 and related vehicle equipment.

In operation, the vehicle 16 is configured to broadcast a signal 30 upon approaching the pickup location. The signal 30 may correspond to a trip identifier defined by a unique alpha numeric code that is generated specifically for the pickup request. The trip identifier may be generated by the intermediary 14 and subsequently transmitted to both the vehicle 16 and the mobile electronic device 12. In this manner, as the vehicle 16 approaches the pickup location, the specific location of the intended passenger 18 relative to the vehicle 16 may be determined based on a signal exchange between the vehicle 16 and the mobile electronic device 12.

Figure 2:
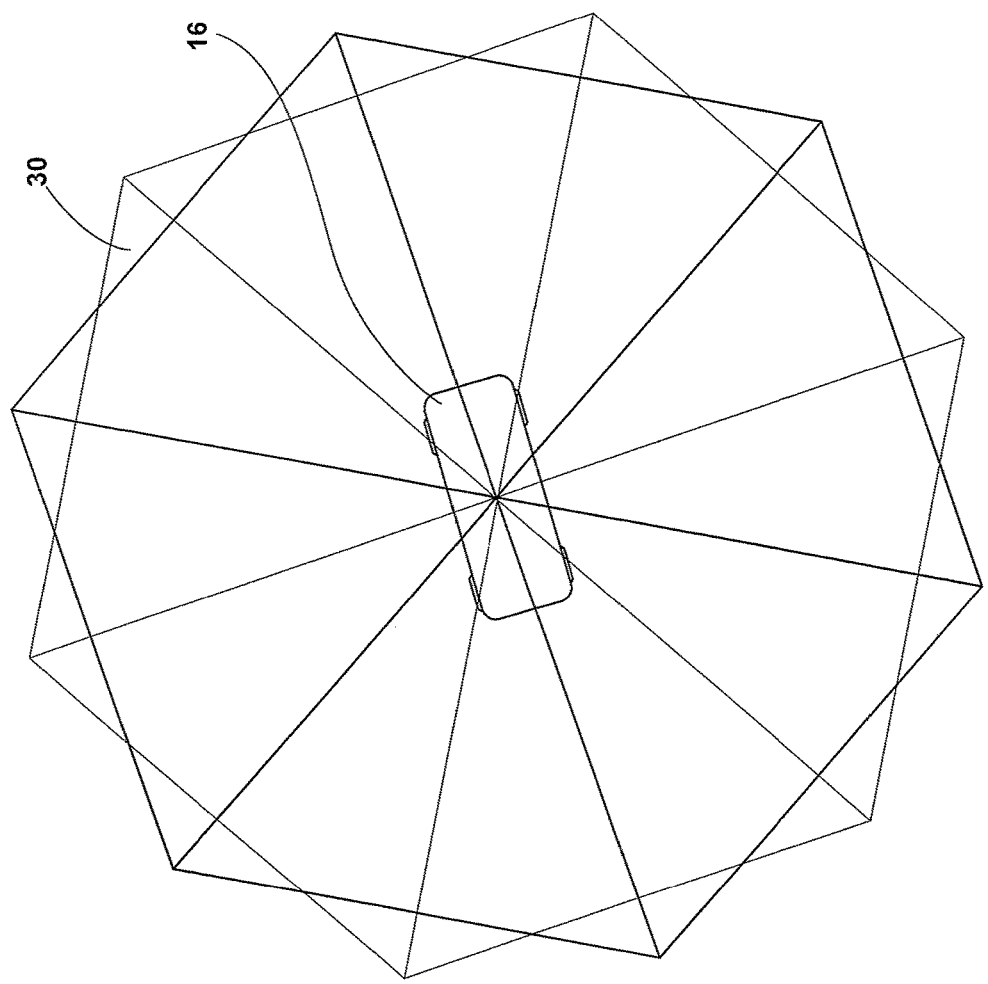
FIG. 2 illustrates the signal broadcasting from an autonomous shuttle vehicle in a 360 degree range.

In the depicted embodiment, the signal 30 may be broadcasted by the communication system 22 of the vehicle 16. The communication system 22 may include a plurality of directional antennas 32 that may be variously located on the vehicle 16. The directional antennas 32 may be configured as Yagi antennas, corner reflector antennas, and/or other directional antennas known to a skilled artisan. The directional antennas 32 may each be located at a unique position on the vehicle 16 or alternatively located in close proximity to each other. According to one embodiment, the directional antennas 32 are arranged on top of the vehicle 16 such that the signal 30 has 360 degree directionality (FIG. 2), thereby maximizing signal coverage and increasing the likelihood of signal exchange between the directional antennas 32 and the mobile electronic device 12. Interfacing between the mobile electronic device 12 and the communication system 22 may be achieved via the same application used to send out the pickup request or a different application if desired. In a specific example, the signal 30 exchanged between the mobile electronic device 12 and the directional antennas 32 corresponds to a Bluetooth® low energy (BLE) signal. However, it is contemplated that other forms of wireless communication protocols may be used instead, such as Wi-Fi®, for example. In any event, the controller 20 may utilize the signal strength of the signal exchange between the directional antennas 32 and the mobile electronic device 12 to triangulate the location of the intended passenger 18.

Detecting the presence of the mobile electronic device 12, and by extension, the intended passenger 18, has several advantages. First, it informs the controller 20 that the intended passenger 18 is present at or near the pickup location. Second, it enables the controller 20 to modify the pickup location in the event the intended passenger 18 is detected somewhere else. Accordingly, by determining the location of the intended passenger 18 relative to the vehicle 16, the vehicle 16 may be positioned in the best possible pickup location using information provided by the GPS 28 and/or sensing system 26. In one embodiment, the sensing system 26 may include sensors such as LIDAR, radar, infrared, vision-based, or other sensor types known to a skilled artisan. Thus, by leveraging information provided by the GPS 28 and the sensing system 26, the vehicle 16 may be autonomously operated to position itself at the pickup location or the next best alternative depending on the location of the intended passenger 18. With respect to the embodiments described herein, it is to be understood that the pickup location may correspond to a position specified by the intended passenger 18 or the intermediary 14, or otherwise correspond to a current location of the intended passenger 18, which may be transmitted from the mobile electronic device 12 to the intermediary 14 and/or the communication system 22 of the vehicle 16 and may be based on positional information provided by a GPS application stored on the mobile electronic device 12.

Upon detecting a signal exchange between the communication system 22 and the mobile electronic device 12, the controller 20 may prompt the display system 24 of the vehicle 16 to display a vehicle identifier notifying the passenger that the requested vehicle is arriving. The display system 24 may be provided externally on the vehicle 16 and positioned so as to be easily seen by the intended passenger 18. The vehicle identifier may correspond to a code, symbol, image, and/or any other visual identifier. The vehicle identifier may be generated by the intermediary 14 and transmitted to the controller 20. Additionally, the vehicle identifier may be transmitted to the mobile electronic device 12 and displayed on a display 34 thereon. Alternatively, the controller 20 may generate the vehicle identifier and transmit the same to the detected mobile electronic device 12. In either instance, the intended passenger 18 can match the identifier appearing on the mobile electronic device 12 to that displayed on the vehicle 16 in order to confirm that the vehicle 16 arriving or stationed at the pickup location is actually the requested vehicle. By providing the vehicle identifier, the intended passenger 18 is further able to distinguish between the requested vehicle and other shuttle vehicles that are picking up passengers in the same general area.

Figure 3:
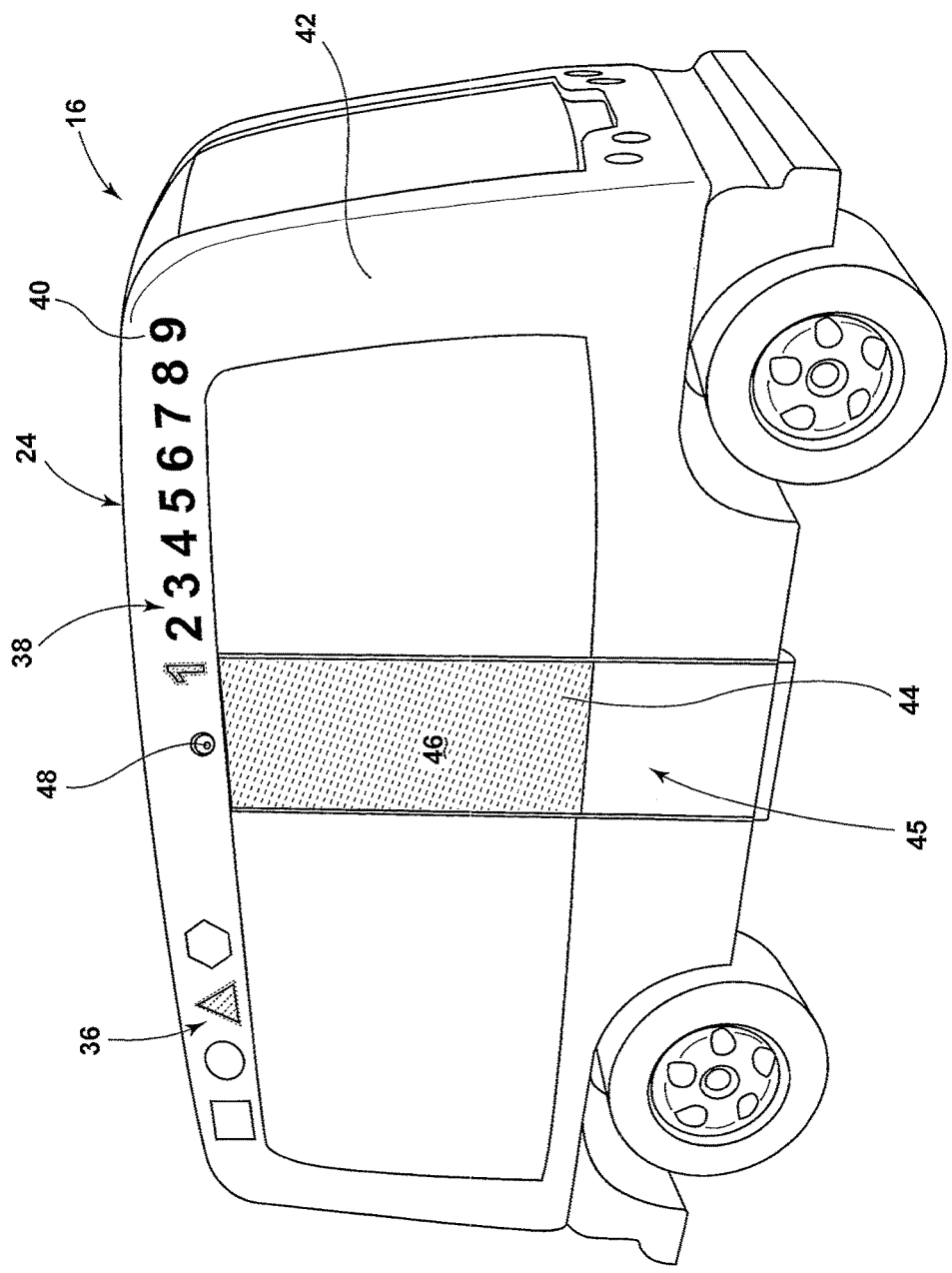
FIG. 3 illustrates the autonomous shuttle vehicle according to one embodiment.

Referring to FIG. 3, the display system 24 is shown having a number of illuminable symbols 36 and an illuminable numeric sequence 38 exemplarily disposed along an upper extent 40 of a side 42 of the vehicle 16. While not shown, it is to be understood that a similar arrangement may be provided on the other side of the vehicle 16. For purposes of illustration and not limitation, the symbols 36 include a square, circle, triangle, and hexagon and the numeric sequence 38 includes an ordered arrangement of numbers 1-9. The symbols 36 and/or numbers of the numeric sequence 38 may illuminate in the same color or in different colors, and may each be independently operated by the controller 20. According to one embodiment, the vehicle identifier is defined by illuminating one or more of the symbols 36 and/or numbers of the numeric sequence. As exemplarily shown in FIG. 3, the triangle symbol and the number "1" are illuminated to define one possible vehicle identifier. As described herein, the same vehicle identifier is sent to the mobile electronic device 12 to be displayed thereon, thereby enabling the intended passenger 18 to match the vehicle identifier displayed on the mobile electronic device 12 to that displayed on the vehicle 16. In some embodiments, the vehicle identifier displayed on the vehicle 16 may be made to blink, change color, or effectuate other visual effects to notify the intended passenger 18 that the vehicle 16 has arrived. The same visual effects may also be mirrored by the vehicle identifier displayed on the mobile electronic device 12.

With continued reference to FIG. 3, the vehicle 16 includes a powered door 44 that is operated by the controller 20 to move between an open and closed position. The door 44 includes a light assembly 45 having an at least partially transparent portion 46 (e.g., glass) coupled to a light-diffusing element (not shown), which may span the substantial entirety of portion 46. The light-diffusing element is configured to disperse light in a uniform fashion across portion 46 such that portion 46 exhibits illumination that is visible to onlookers located outside the vehicle 16 as well as passengers located inside the vehicle 16. Light may be provided to the light-diffusing element by one or more light-emitting diodes (LEDs) (not shown) coupled to the door 44 and arranged as side emitters, top emitters, bottom emitters, or a combination thereof. The LEDs may be of the RGB variety thereby enabling portion 46 to be illuminated in a variety of colors. Additional information regarding the construction such light assemblies can be found in U.S. patent application Ser. No. 15/171,620 to Salter et al, entitled "DOME LIGHT ASSEMBLIES AND UNITS THAT PRODUCE NATURAL AND COURTESY LIGHT PATTERNS," which is incorporated herein by reference in its entirety.

Operation of the LEDs may be controlled by the controller 20 such that portion 46 of the door 44 illuminates in different colors based on an entry sequence of the intended passenger 18. According to one embodiment, the portion 46 may illuminate in a first color (e.g., yellow/amber) when the controller 20 determines the location of the intended passenger 18. Not only does this inform the intended passenger 18 of the door 44 location on the vehicle 16, but also informs other passengers located inside the vehicle 16 that the vehicle 16 will be picking someone up. According to one embodiment, the controller 20 may prevent the door 44 from opening until a security code is received from the mobile electronic device 12. The security code may be generated by the controller 20 and transmitted to the mobile electronic device 12 via the communication system 22 of the vehicle 16 subsequent to the controller 20 determining the location of the intended passenger 18. In this manner, the security code is only received by the intended passenger 18 once a proper signal handshake occurs between the mobile electronic device 12 and the communication system 22 of the vehicle 16. Alternatively, the security code may be generated by the intermediary 14 and transmitted to the mobile electronic device 12 at any point after the intended passenger 18 makes a trip request.

As a security feature of the vehicle 16, it is contemplated that the intended passenger 18 may be required to manually enter the security code to prompt the controller 20 to open the door 44, thereby minimizing the risk of an unpermitted individual entering into the vehicle 16. Alternatively, the controller 20 may automatically open the door 44 once the mobile electronic device 12 in possession of the security code is detected within an allowable distance (e.g., 5 feet) from the door 44. According to one embodiment, it is contemplated that portion 46 of the door 44 may illuminate in a green blinking pattern while the vehicle 16 is stopped and the controller 20 waits for the intended passenger 18 to enter the security code or until the mobile electronic device 12 is detected within the allowable distance. As an additional security feature, the vehicle 16 may include a camera 48 mounted above the door 44 and operable by the controller 20 to record and/or take pictures as people enter and exit the vehicle 16. The recorded video or pictures may be streamed by an operator located at a shuttle control center and charged with the monitoring of the vehicle 16. In some embodiments, the intended passenger 18 may use the mobile electronic device 12 to transmit a distress signal to the communication system 22 of the vehicle 16 and/or the intermediary 14 in emergency scenarios. In response, the controller 20 may implement one or more countermeasures such as immediately activating the camera 48 to begin recording video that is streamable by the operator, who may then initiate a response to the emergency (e.g., call the police, ambulance, etc.), flashing the exterior lights of the vehicle 16, and/or sounding a horn of the vehicle 16.

Figure 4:
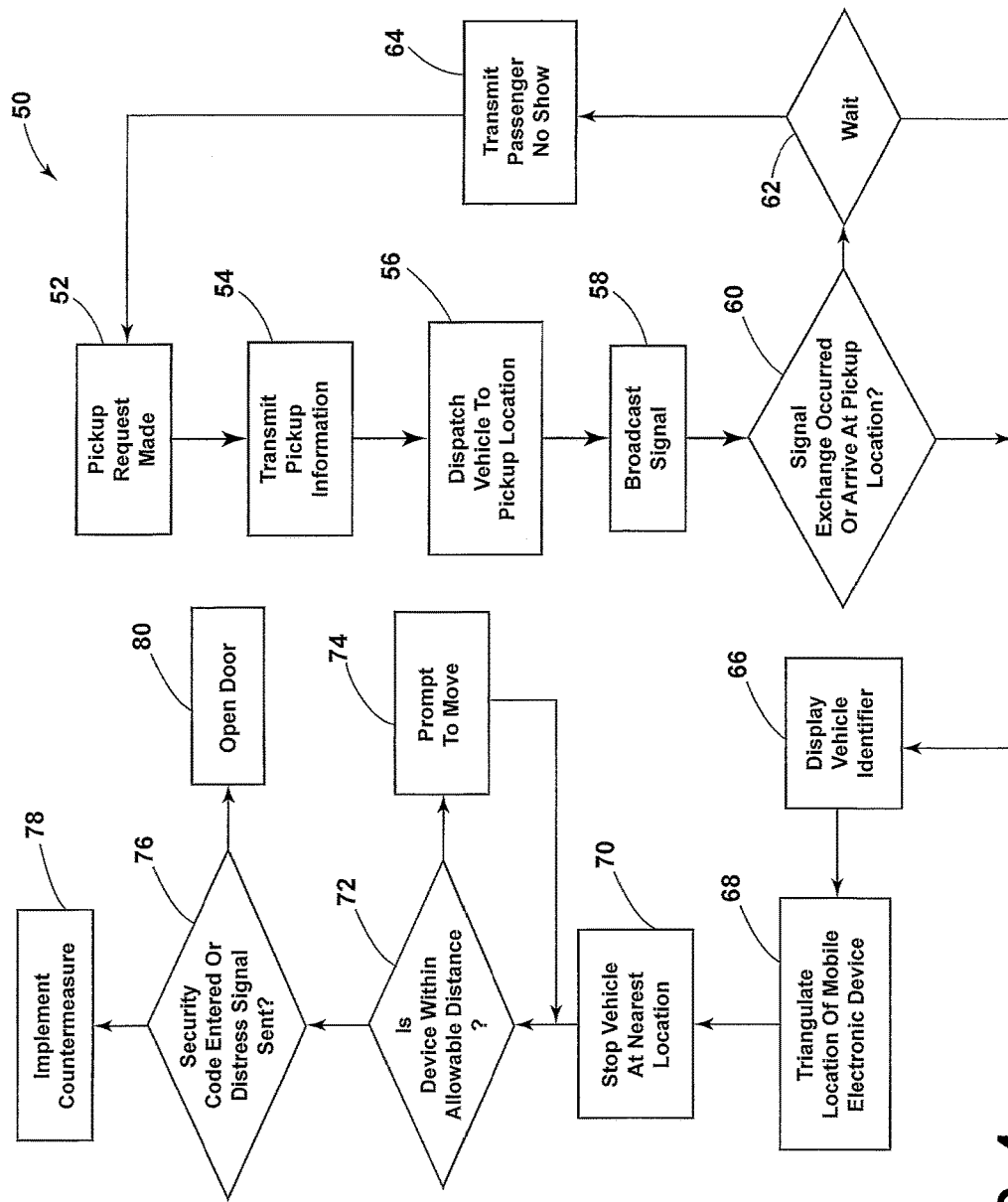
FIG. 4 is a flow diagram of a passenger pickup method according to one embodiment.

Referring to FIG. 4, a passenger pickup method 50 is shown according to one exemplary embodiment and may be implemented by the system 10 described previously herein with reference to FIGS. 1-3. The method 50 begins at step 52, where the intended passenger 18 makes a pickup request to a shuttle service using the mobile electronic device 12. At step 54, the shuttle service transmits pickup information to the mobile electronic device 12. The pickup information may include the trip identifier, the vehicle identifier, the security code, and/or an estimated arrival of the vehicle 16. Upon receiving the pickup information, the intended passenger 18 may confirm the trip, thereby prompting the vehicle 16 to be dispatched to a pickup location at step 56. At step 58, the vehicle 16 broadcasts the signal 30 as it approaches the pickup location (e.g., is within a quarter mile). At step 60, the controller 20 determines whether a signal exchange has occurred between the vehicle 16 and the mobile electronic device 12 or whether the vehicle 16 has arrived at the pickup location. If only the latter (i.e., arrival at the pickup location) has occurred, the vehicle 16 waits at the pickup location for a predetermined time (e.g., 10 minutes) at step 62. If no signal exchange is detected between the vehicle 16 and the mobile electronic device 12 by the end of the waiting period, the vehicle 16 transmits a passenger no show signal to the intermediary 14 and/or the mobile electronic device 12 at step 64, and the method 50 returns to step 52.

If a signal exchange is detected at either steps 60 or 62 (e.g., prior to the lapsing of the waiting period), the vehicle displays the display identifier at step 66. Additionally, portion 46 of the door 44 may be illuminated in a yellow or amber color. At step 68, the controller 20 triangulates the location of the mobile electronic device 12, and hence, the intended passenger 18. Having determined the location of the intended passenger 18, the vehicle 14 stops at the nearest location at step 70. As described herein, the ultimate pickup location may be determined based on the determined location of the intended passenger 18, information received from the GPS 28, information received from the sensing system 26, or a combination thereof. According to one embodiment, the vehicle 16 stops in an orientation where its door 44 faces the intended passenger 18. Additionally, once the vehicle 16 has stopped, portion 46 of the door 44 may be illuminated in a green flashing pattern. At step 72, the controller 20 determines whether the mobile electronic device 12 is located within an allowable distance (e.g., 5 feet) from the door 44. If not, a message may be displayed on the mobile electronic device 12 prompting the intended passenger 18 to move closer to the door 44 (step 74). The message may be generated based on signals transmitted from the communication system 22 to the mobile electronic device 12.

Once the mobile electronic device 12 is determined to be within the allowable distance from the door 44, the controller 20 checks whether the security code has been entered or whether a distress signal has been made using the mobile electronic device 12 at step 76. If the only the former has occurred, the controller 20 opens the door 44. Additionally, once the security code is entered, portion 46 of the door 44 may be illuminated continuously in a green color for a brief period of time (e.g., 2 seconds) before the door 44 is opened. Additionally still, the camera 48 may be activated upon entry of the security code. If a distress signal has been made, the controller 20 implements one or more countermeasures, which may include any of those described above with reference to FIG. 3.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below are incorporated into and constitute part of this Detailed Description.

What is claimed is:

1. A passenger pickup system comprising:
    a mobile electronic device with which an intended passenger inputs a pickup request;
    a vehicle dispatched to a pickup location and configured to:
        broadcast a signal;
        determine a location of the passenger based on a signal exchange between the vehicle and the electronic device;
        display a vehicle identifier notifying the passenger of the vehicle's arrival; and
        determine whether the electronic device is located within an allowable distance from a door of the vehicle, and if not, transmit a message to the electronic device, wherein the message is displayed on the electronic device and prompts the passenger to move closer to the door.

2. The passenger pickup system of claim 1, wherein the mobile device is a smartphone having an application stored thereon that interfaces with a communication system of the vehicle.

3. The passenger pickup system of claim 1, wherein the vehicle broadcasts the signals using a number of directional antennas and triangulates the location of the passenger based on the strength of the signal exchange between each antenna and the electronic device.

4. The passenger pickup system of claim 1, wherein the signal comprises a trip identifier having a unique alpha numeric code.

5. The passenger pickup system of claim 1, wherein the vehicle identifier is also displayed on the electronic device thereby enabling the passenger to correctly identify the vehicle.

6. The passenger pickup system of claim 1, wherein the vehicle identifier is made to illuminate and is selected from a number of symbols and a numeric sequence.

7. A passenger pickup system comprising:
    a mobile electronic device with which an intended passenger inputs a pickup request;
    a vehicle dispatched to a pickup location and configured to:
        detect a location of the passenger based on a signal exchange between the vehicle and the electronic device;
        display a vehicle identifier notifying the passenger of the vehicle's arrival;
        determine whether the mobile electronic device is located within an allowable distance from a door of the vehicle, and if not, transmit a message to the mobile electronic device, wherein the message is displayed on the mobile electronic device and prompts the passenger to move closer to the door; and
        deny the passenger from entering the vehicle until a security code is received from the electronic device.

8. The passenger pickup system of claim 7, wherein the vehicle is configured to open the door based on the passenger manually entering the security code using the electronic device.

9. The passenger pickup system of claim 7, wherein the vehicle is configured to open the door based on the security code being received while the electronic device is detected within the allowable distance from the door.

10. The passenger pickup system of claim 7, wherein at least a portion of the door is illuminable on both sides such that the resultant illumination is visible from outside and inside the vehicle.

11. The passenger pickup system of claim 10, wherein the door illuminates in a blinking pattern while the vehicle waits to receive the security code.

12. The passenger pickup system of claim 7, wherein the vehicle comprises a security camera configured to record video or images of people entering or exiting the vehicle.

13. The passenger pickup system of claim 12, wherein the vehicle is configured to implement a countermeasure if a distress signal is received from the electronic device, wherein the countermeasure comprises at least one of activating the camera, flashing exterior lights of the vehicle, and sounding a horn of the vehicle.

14. A passenger pickup system comprising:
- a mobile electronic device with which an intended passenger inputs a pickup request;
- a vehicle dispatched to a pickup location and configured to:
  - detect a location of the passenger based on a signal exchange between the vehicle and the electronic device;
  - display a vehicle identifier notifying the passenger of the vehicle's arrival;
  - illuminate a door of the vehicle in a blinking pattern;
  - determine whether the mobile electronic device is located within an allowable distance from a door of the vehicle, and if not, transmit a message to the mobile electronic device, wherein the message is displayed on the mobile electronic device and prompts the passenger to move closer to the door;
  - deny the passenger from entering the vehicle until a security code is received from the electronic device; and
  - upon receiving the security code, illuminate the door continuously for a period of time before opening the door.

15. The passenger pickup system of claim 14, wherein at least a portion of the door is illuminable on both sides such that the resultant illumination is visible from outside and inside the vehicle.

16. The passenger pickup system of claim 14, wherein the vehicle is configured to implement a countermeasure if a distress signal is received from the electronic device while the electronic device is within the allowable distance from the vehicle.

17. The passenger pickup system of claim 16, wherein the countermeasure comprises activating a camera to record video or images.

18. The passenger pickup system of claim 16, wherein the countermeasure comprises flashing exterior lights of the vehicle.

19. The passenger pickup system of claim 16, wherein the countermeasure comprises sounding a horn of the vehicle.

* * * * *